United States Patent
Ku et al.

(10) Patent No.: US 8,504,065 B2
(45) Date of Patent: Aug. 6, 2013

(54) SYSTEM AND METHOD FOR TRACKING A MOBILE TELECOMMUNICATION APPARATUS

(75) Inventors: Chen-Wei Ku, Taipei (TW); Chun-Chi Chao, New Taipei (TW); Sheng-Lung Yu, New Taipei (TW)

(73) Assignee: Leadtek Research Inc., New Taipei (TW)

( * ) Notice: Subject to any disclaimer, the term of this patent is extended or adjusted under 35 U.S.C. 154(b) by 0 days.

(21) Appl. No.: 13/450,446

(22) Filed: Apr. 18, 2012

(65) Prior Publication Data
US 2012/0302198 A1   Nov. 29, 2012

Related U.S. Application Data

(60) Provisional application No. 61/491,223, filed on May 29, 2011.

(51) Int. Cl.
*H04W 24/00* (2009.01)
*H04W 4/00* (2009.01)
*G06F 7/00* (2006.01)
*G06F 19/00* (2011.01)

(52) U.S. Cl.
USPC ............ 455/456.1; 455/456.2; 455/456.3; 455/456.6; 455/457; 455/466; 701/32.4

(58) Field of Classification Search
USPC ............ 455/410, 404.2, 456.1, 457, 414.2, 455/466; 701/32.4
See application file for complete search history.

(56) References Cited

U.S. PATENT DOCUMENTS

| | | | |
|---|---|---|---|
| 2006/0030339 A1* | 2/2006 | Zhovnirovsky et al. | 455/456.6 |
| 2008/0031251 A1* | 2/2008 | Rajan | 370/392 |
| 2008/0274752 A1* | 11/2008 | Houri | 455/456.1 |
| 2009/0066564 A1* | 3/2009 | Burroughs et al. | 342/357.1 |
| 2010/0134280 A1* | 6/2010 | Caetano Pereira et al. | 340/539.17 |
| 2010/0182341 A1* | 7/2010 | Lee et al. | 345/635 |
| 2011/0159845 A1* | 6/2011 | Sanjeev | 455/411 |

* cited by examiner

*Primary Examiner* — Vladimir Magloire
*Assistant Examiner* — Michael Mapa
(74) *Attorney, Agent, or Firm* — Jianq Chyun IP Office

(57) ABSTRACT

A system and a method for tracking a mobile telecommunication apparatus are provided. The system includes a first mobile telecommunication apparatus and a second mobile telecommunication apparatus. The first mobile telecommunication apparatus has a Global Positioning System (GPS) module to provide position information of the first mobile telecommunication apparatus. The second mobile telecommunication apparatus transmits a query instruction to the first mobile telecommunication apparatus by the Short Message Service (SMS). The first mobile telecommunication apparatus transmits the position information back to the second mobile telecommunication apparatus by the SMS in accordance with the query instruction.

27 Claims, 3 Drawing Sheets

SYSTEM AND METHOD FOR TRACKING A MOBILE TELECOMMUNICATION APPARATUS

CROSS-REFERENCE TO RELATED APPLICATION

This application claims the priority benefits of U.S. provisional application Ser. No. 61/491,223, filed on May 29, 2011. The entirety of the above-mentioned patent application is hereby incorporated by reference herein and made a part of this specification.

BACKGROUND OF THE INVENTION

1. Field of the Invention

The present invention generally relates to a care system, in particular, to a system and a method for tracking a mobile telecommunication apparatus.

2. Description of Related Art

Under the social trend of low birth rate, the population of the elderly continuously increases. Many electronic instruments and systems for taking care of children or the elderly have been developed, such as mobile phones for children or the elderly and Global Positioning System (GPS)-based emergency care and caring apparatuses. However, an existing GPS-based emergency care and caring apparatus requires a large remote background server to receive and parse GPS latitude and longitude data. As the conventional care system demands the service provided by the large remote background server, uses have to pay the service charge monthly.

SUMMARY OF THE INVENTION

Accordingly, the present invention is directed to a system and a method for tracking a mobile telecommunication apparatus, which enable a mobile telecommunication apparatus to directly track the location of another mobile telecommunication apparatus without requiring a large remote background server.

An embodiment of the present invention provides a system for tracking a mobile telecommunication apparatus, which includes a first mobile telecommunication apparatus and a second mobile telecommunication apparatus. The first mobile telecommunication apparatus has a GPS module to provide position information of the first mobile telecommunication apparatus. The second mobile telecommunication apparatus transmits a query instruction to the first mobile telecommunication apparatus by the Short Message Service (SMS). The first mobile telecommunication apparatus transmits the position information back to the second mobile telecommunication apparatus by the SMS in accordance with the query instruction.

An embodiment of the present invention provides a method for tracking a mobile telecommunication apparatus, which includes: a GPS module providing position information of a first mobile telecommunication apparatus; a second mobile telecommunication apparatus transmitting a query instruction to the first mobile telecommunication apparatus by the SMS; and the first mobile telecommunication apparatus transmitting the position information back to the second mobile telecommunication apparatus by the SMS in accordance with the query instruction.

An embodiment of the present invention provides a system for tracking a mobile telecommunication apparatus, which includes a first mobile telecommunication apparatus and a second mobile telecommunication apparatus. The first mobile telecommunication apparatus has a GPS module to provide emergency position information of the first mobile telecommunication apparatus. The second mobile telecommunication apparatus has a database management module for recording at least one emergency contact phone number. When an emergency function of the first mobile telecommunication apparatus is triggered, the first mobile telecommunication apparatus transmits the emergency position information to the second mobile telecommunication apparatus by the SMS. The second mobile telecommunication apparatus converts the emergency position information to an address corresponding to a location of the first mobile telecommunication apparatus, and then transmits the address and an emergency text to a telecommunication apparatus corresponding to the at least one emergency contact phone number recorded by the database management module by the SMS.

An embodiment of the present invention provides a method for tracking a mobile telecommunication apparatus, which includes: a GPS module providing emergency position information of a first mobile telecommunication apparatus; a second mobile telecommunication apparatus recording at least one emergency contact phone number; when an emergency function of the first mobile telecommunication apparatus is triggered, the first mobile telecommunication apparatus transmitting the emergency position information to the second mobile telecommunication apparatus by the SMS; the second mobile telecommunication apparatus converting the emergency position information to an address corresponding to a location of the first mobile telecommunication apparatus; and the second mobile telecommunication apparatus transmitting the address and an emergency text to a telecommunication apparatus corresponding to the at least one emergency contact phone number by the SMS.

In an embodiment of the present invention, the query instruction includes a leading code and a password. If the first mobile telecommunication apparatus determines that the leading code and the password are correct, the first mobile telecommunication apparatus transmits the position information back to the second mobile telecommunication apparatus by the SMS.

In an embodiment of the present invention, after the first mobile telecommunication apparatus receives the query instruction, the GPS module is powered on to generate the position information. After the first mobile telecommunication apparatus transmits the position information back to the second mobile telecommunication apparatus, the GPS module is powered off. After the position information is transmitted back to the second mobile telecommunication apparatus, the first mobile telecommunication apparatus deletes an SMS message carrying the query instruction and an SMS message carrying the position information.

In an embodiment of the present invention, the position information includes a leading code, a latitude, a longitude, an international mobile equipment identify (IMEI) code, a mobile country code (MCC), a mobile network code (MNC), a location area code (LAC), a cell identification (ID) code, and/or universal time coordinated (UTC).

In an embodiment of the present invention, the second mobile telecommunication apparatus has a map management module and/or a database management module. The map management module converts the position information to an address corresponding to a location of the first mobile telecommunication apparatus. The database management module records the position information.

In an embodiment of the present invention, the system further includes a third mobile telecommunication apparatus. The third mobile telecommunication apparatus transmits a query request to the second mobile telecommunication apparatus by the SMS. The second mobile telecommunication apparatus transmits the query instruction to the first mobile telecommunication apparatus in accordance with the query request; the second mobile telecommunication apparatus converts the position information to an address corresponding to a location of the first mobile telecommunication apparatus; and the second mobile telecommunication apparatus transmits the address back to the third mobile telecommunication apparatus by the SMS.

In an embodiment of the present invention, the second mobile telecommunication apparatus has a database management module for recording at least one emergency contact phone number. When an emergency function of the first mobile telecommunication apparatus is triggered, the first mobile telecommunication apparatus transmits emergency position information to the second mobile telecommunication apparatus by the SMS. The second mobile telecommunication apparatus converts the emergency position information to an address corresponding to a location of the first mobile telecommunication apparatus, and transmits the address and an emergency text to a telecommunication apparatus corresponding to the at least one emergency contact phone number recorded by the database management module by the SMS.

Based on the above, in the embodiments of the present invention, the second mobile telecommunication apparatus may transmit the query instruction to the first mobile telecommunication apparatus by the SMS, and the first mobile telecommunication apparatus transmits the position information provided by the GPS module back to the second mobile telecommunication apparatus by the SMS in accordance with the query instruction. Therefore, the second mobile telecommunication apparatus may directly track the location of the first mobile telecommunication apparatus without requiring any additional remote server, so that users may save the service charge paid to the system manufacturer monthly.

In order to make the aforementioned and other objectives and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
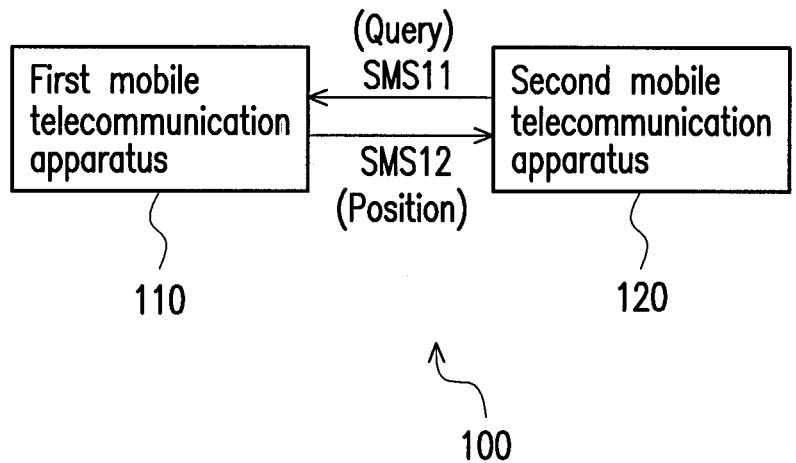
FIG. 1 is a schematic view of an application scenario of a system for tracking a mobile telecommunication apparatus according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic view of an application scenario of a system 100 for tracking a mobile telecommunication apparatus according to an embodiment of the present invention. The system 100 includes a first mobile telecommunication apparatus 110 and a second mobile telecommunication apparatus 120. This embodiment will use the first mobile telecommunication apparatus 110 as a target apparatus being cared for. For example, an elderly person (or a child) being cared for carries/uses the first mobile telecommunication apparatus 110. Any mobile electronic apparatus having a GPS module and capable of transmitting and receiving the SMS may be used as the first mobile telecommunication apparatus 110, for example, a mobile phone for the elderly.

Figure 2:
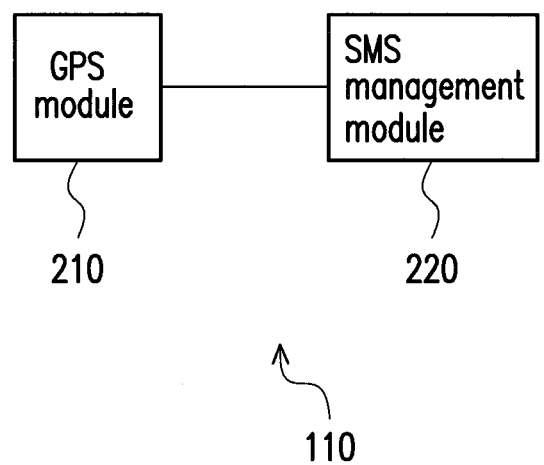
FIG. 2 is a schematic functional block diagram of the first mobile telecommunication apparatus in FIG. 1 according to an embodiment of the present invention.

FIG. 2 is a schematic functional block diagram of the first mobile telecommunication apparatus 110 in FIG. 1 according to an embodiment of the present invention. The first mobile telecommunication apparatus 110 includes a GPS module 210 and an SMS management module 220. Definitely, the first mobile telecommunication apparatus 110 may also include other functional blocks known in the art and not depicted in FIG. 2, such as a power supply module, a wireless telecommunication module and keys, which will not be detailed herein. The GPS module 210 may provide position information of a current location of the first mobile telecommunication apparatus 110 to the SMS management module 220. For example, the position information may include a latitude and a longitude.

Refer to FIG. 1. Smart phones become more popular as time goes on. Many application programs may be built/run in smart phones. This embodiment will use a smart phone to implement the second mobile telecommunication apparatus 120. Therefore, this embodiment may implement the method for tracking a mobile telecommunication apparatus as an application program (temporarily referred to as "iGuardian Application System") through software, and install or run the application program in the second mobile telecommunication apparatus 120. In other embodiments, the method for tracking a mobile telecommunication apparatus may be implemented in the second mobile telecommunication apparatus 120 through hardware or firmware. In addition, the second mobile telecommunication apparatus 120 may be other mobile electronic apparatuses capable of transmitting and receiving the SMS, such as a notebook computer and a tablet computer.

The second mobile telecommunication apparatus 120 may be carried/used by a family member of the elderly person (or child) being cared for. If the user wants to know the current location of the elderly person (or child) being cared for, the user may operate the second mobile telecommunication apparatus 120 to trigger a tracking function of "iGuardian Application System". After the tracking function of "iGuardian Application System" is triggered, the second mobile telecommunication apparatus 120 transmits a query instruction SMS11 in a text form to the first mobile telecommunication apparatus 110 by the SMS. The first mobile telecommunication apparatus 110 transmits position information SMS12 provided by the GPS module 210 back to the second mobile telecommunication apparatus 120 by the SMS in accordance with the query instruction SMS11.

Those skilled in the art may define data structures, syntax and content of the query instruction SMS11 and the position information SMS12 according to design demands. For example, an SMS message carrying the query instruction SMS11 includes a leading code and a password (password), and an SMS message carrying the position information SMS12 includes a leading code, a latitude and a longitude. In this embodiment, the query instruction SMS11 further includes a type code for indicating the attribute of the SMS message. For example, according to design demands, those skilled in the art may define the leading code as "*#LR", use a type code "0" to indicate that the SMS message is a query instruction actively sent by the second mobile telecommunication apparatus 120, define the password as "1234", and define different fields separated by ",". Therefore, the content of the query instruction SMS11 in the SMS message transmitted to the first mobile telecommunication apparatus 110 may be "*#LR,0,1234". If the first mobile telecommunication apparatus 110 determines that the leading code and the password are correct, the first mobile telecommunication apparatus 110 transmits the position information SMS12 back to the second mobile telecommunication apparatus 120 by the SMS.

The GPS module 210 may be in an enabled state at any time, so as to provide latitude and longitude data to the SMS management module 220 within a shortest period. In this embodiment, after the SMS management module 220 of the first mobile telecommunication apparatus 110 receives the query instruction SMS11, the GPS module 210 is powered on (or turned on) or enabled, to generate the latitude and longitude data (the position information) to the SMS management module 220. After the SMS management module 220 of the first mobile telecommunication apparatus 110 transmits the position information SMS12 back to the second mobile telecommunication apparatus 120, the GPS module 210 is powered off (or turned off) or disabled. By powering off the GPS module 210, the power consumption of the GPS module 210 may be saved.

On the other hand, when the first mobile telecommunication apparatus 110 transmits and receives SMS messages, the SMS management module 220 stores the SMS messages. However, no matter for the query instruction SMS11 or the position information SMS12, the content of the SMS messages is strange and incomprehensible to the user. Therefore, after the position information SMS12 is transmitted back to the second mobile telecommunication apparatus 120, the SMS management module 220 of the first mobile telecommunication apparatus 110 deletes the SMS message carrying the query instruction SMS11 and the SMS message carrying the position information SMS12, so as to prevent the SMS messages from occupying the memory space.

In this embodiment, the position information further includes a type code for indicating the attribute of the SMS message. The data structure of the position information SMS12 in the SMS message transmitted back to the second mobile telecommunication apparatus 120 is "leading code, type code, latitude, longitude". For example, assuming that the latitude and longitude of the location of the first mobile telecommunication apparatus 110 are respectively "21.12345" and "121.12345", the content of the position information SMS12 in the SMS message transmitted back to the second mobile telecommunication apparatus 120 may be "*#LR,0,21.12345,121.12345". Therefore, the second mobile telecommunication apparatus 120 may parse the position information SMS12 to obtain the location of the first mobile telecommunication apparatus 110.

Figure 3:
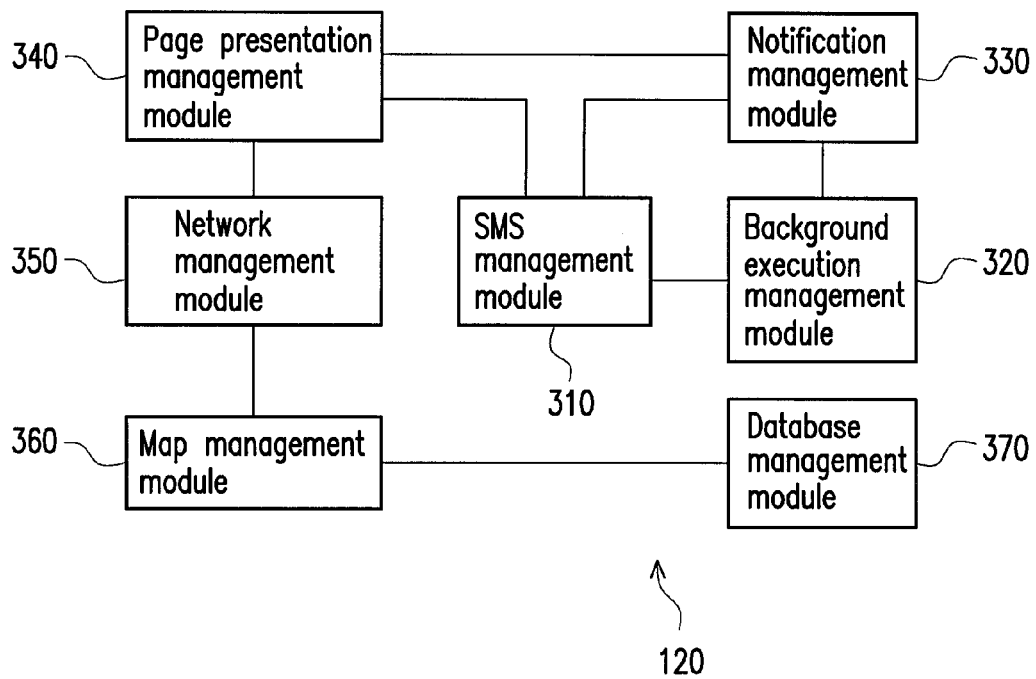
FIG. 3 is a schematic functional block diagram of the second mobile telecommunication apparatus in FIG. 1 according to an embodiment of the present invention.

As ordinary users are not familiar with latitude and longitude, the second mobile telecommunication apparatus 120 may be configured with a map management module according to design demands. The map management module may mark the location of the first mobile telecommunication apparatus 110 in a map according to the latitude and longitude for ease of understanding by the user. FIG. 3 is a schematic functional block diagram of the second mobile telecommunication apparatus 120 in FIG. 1 according to an embodiment of the present invention. The second mobile telecommunication apparatus 120 includes an SMS management module 310, a background execution management module 320, a notification management module 330, a page presentation management module 340, a network management module 350, a map management module 360 and a database management module 370. According to design demands of actual products, the modules 310-370 may be implemented through hardware, firmware and/or software. Definitely, the second mobile telecommunication apparatus 120 may also include other functional blocks known in the art and not depicted in FIG. 3, such as a power supply module, a wireless telecommunication module and keys, which will not be detailed herein.

Referring to FIG. 3, the network management module 350 processes all network related events, including network related processing mechanism and feedback for "Network Error Information", "Slow Network Performance", "Failed Network Connection" and "Network Error". The network management module 350 aims to ensure smooth and complete acquisition of network information during program execution. The database management module 370 processes accounts and relevant data of all apparatuses being cared for (Tracked Phones), and a history of tracking apparatuses being cared for, for example, processing functions of "Add Tracked Phone", "Modify Tracked Phone", "Delete Tracked Phone", "Add Tracking Data" and "Delete Tracking Data". The database management module 370 aims to ensure recording of relevant data during program execution for future query.

The page presentation management module 340 processes presentation of all pages, including processing related to display effects such as "Icon Sliding", "Click Function", "Long Press Function", "Switch Page", "Add Tracked Phone", "Modify Tracked Phone", "Delete Tracked Phone" and "Delete Caring Data". The SMS management module 310 is responsible for sending relevant SMS messages, and processing SMS messages received from the apparatus being cared for. When the second mobile telecommunication apparatus 120 receives the SMS message, and after the second mobile telecommunication apparatus 120 successfully sends the SMS message, the notification management module 330 notifies the user of a relevant state. The background execution management module 320 is responsible for managing application programs run through background execution, so as to ensure normal operation of the system. Functions of the map management module 360 include "Map Presentation", "Coordinate Icon Display", "Address Conversion", and latitude and longitude related processing. The map management module 360 aims to implement relevant applications such as conversion of the position information SMS12 (for example, the latitude and longitude) fed back by the apparatus being cared for to a text address and actual map display.

After the tracking function of "iGuardian Application System" in the second mobile telecommunication apparatus 120 is triggered, for example, the user clicks a "Real-time Tracking" function through the page presentation management module 340, "iGuardian Application System" sends an instruction to the SMS management module 310 through the page presentation management module 340. After the SMS management module 310 is triggered by the page presentation management module 340, the SMS management module 310 sends relevant SMS message content according to data clicked by the user, and triggers the notification management module 330 to remind the user that relevant operations have been completed. For example, assuming that a tracking target clicked by the user through the page presentation management module 340 is the first mobile telecommunication apparatus 110 and the password of the first mobile telecommunication apparatus 110 is "1234", the SMS management module 310 sends SMS message content related to the first mobile telecommunication apparatus 110, for example, "*#LR, 0, 1234", that is, "leading code, type code, password".

When the second mobile telecommunication apparatus 120 receives an SMS message, the SMS management module 310 first judges whether the content of the SMS message conforms to a communication protocol, for example, checks whether the leading code and the type code in the SMS message are correct, and checks whether the data structure and syntax in the SMS message are correct. Here, it is assumed that the data structure of the position information SMS12 carried in the SMS message transmitted back to the second mobile telecommunication apparatus 120 by the first mobile telecommunication apparatus 110 is "leading code, type code, latitude, longitude", for example, "*#LR, 0, 21.12345, 121.12345".

If the SMS message conforms to the communication protocol, the SMS management module 310 triggers the background execution management module 320, so that the background execution management module 320 manages a relevant background execution function of "iGuardian Application System". Then, the background execution management module 320 triggers the notification management module 330 to notify the user that "iGuardian Application System" is to process and analyze the content of the SMS message. Afterwards, the page presentation management module 340 is triggered, preparing to present a tracking result of "iGuardian Application System" on a display panel.

The page presentation management module 340 downloads electronic map data from the Internet through the network management module 350, and then displays the map on the display panel. The downloaded electronic map is managed by the map management module 360. In other embodiments, the electronic map may be installed in the map management module 360 in advance, so that it is not necessary to download the electronic map from the Internet. The map management module 360 may convert the latitude and longitude (the position information SMS12) in the SMS message sent by the first mobile telecommunication apparatus 110 to a text address corresponding to a current location of the first mobile telecommunication apparatus 110 according to the electronic map. After the conversion from the latitude and longitude to the text address is completed, the map management module 360 displays the correct text address and the correct latitude and longitude on a page. After the map management module 360 processes the data, "iGuardian Application System" stores the relevant position data (the position information SMS12) of the first mobile telecommunication apparatus 110 obtained this time into a database through the database management module 370 for future query. After the database is updated, "iGuardian Application System" may display the latest data through the map management module 360.

Those skilled in the art may modify the above embodiments based on the teachings of the above embodiments. For example, the position information SMS12 transmitted back by the first mobile telecommunication apparatus 110 further includes a phone number of the requesting mobile phone, an international mobile equipment identify (IMEI) code, a mobile country code (MCC), a mobile network code (MNC), a location area code (LAC), a cell ID code, and universal time coordinated (UTC). Here, it is assumed that the data structure of the position information SMS12 carried in the SMS message transmitted back to the second mobile telecommunication apparatus 120 by the first mobile telecommunication apparatus 110 is "leading code, type code, latitude, longitude, IMEI, phone number, cell ID, MCC, MNC, LAC, UTC". The first mobile telecommunication apparatus 110 may obtain, from a base station of a wireless telephone network, an MCC, an MNC and an LAC of the location as well as a cell ID code of the base station, and meanwhile may obtain UTC from its base station.

For example, assuming that the phone number of the second mobile telecommunication apparatus 120 is "0926808124", the IMEI code of the first mobile telecommunication apparatus 110 is "123456789012345", the MCC, the MNC and the LAC of the location of the first mobile telecommunication apparatus 110 as well as the cell ID code of the base station are respectively "446", "92", "2800" and "32226", and the UTC is "110218-030728", the content of the position information SMS12 is "*#LR, 0, 21.12345, 121.12345, 123456789012345, 0926808124, 32226, 446, 92, 2800, 030728".

When the first mobile telecommunication apparatus 110 cannot receive signals from a positioning satellite, for example, indoor, the GPS module 210 cannot provide the latitude and longitude data to the SMS management module 220. Therefore, the position information SMS12 does not contain the latitude and longitude data, and the content is, for example, "*#LR, 0, na, na, 123456789012345, 0926808124, 32226, 446, 92, 2800, 030728", where "na" indicates that no latitude data or longitude data exists. In this case, the map management module 360 of the second mobile telecommunication apparatus 120 may convert the MCC, the MNC, the LAC and the cell ID code of the base station in the position information SMS12 to a text address corresponding to the location of the first mobile telecommunication apparatus 110 (or an address of the base station to which the first mobile telecommunication apparatus 110 belongs), and mark the address on the map. As the address obtained in this case may not be the real location of the first mobile telecommunication apparatus 110, the map management module 360 may mark a service range of the base station on the map to indicate a possible range of the location of the first mobile telecommunication apparatus 110.

Based on the above, the second mobile telecommunication apparatus 120 in this embodiment may transmit the query instruction SMS11 to the first mobile telecommunication apparatus 110 by the SMS, and the first mobile telecommunication apparatus 110 transmits the position information SMS12 (that is, the latitude and longitude data provided by the GPS module, and the MCC, the MNC, the LAC and the cell ID code of the base station provided by the base station) back to the second mobile telecommunication apparatus 120 by the SMS in accordance with the query instruction SMS11. Therefore, the second mobile telecommunication apparatus 120 may directly track the location of the first mobile telecommunication apparatus 110 without requiring any additional remote server, so that users may save the service charge paid to the system manufacturer monthly. In addition, the first mobile telecommunication apparatus 110 (the target apparatus being cared for) may transmit and receive SMS messages simply through a Subscriber Identity Module (SIM) card having a Global System For Mobile Communications (GSM) function, and does not need to use any expensive GPRS or 3G function.

Figure 4:
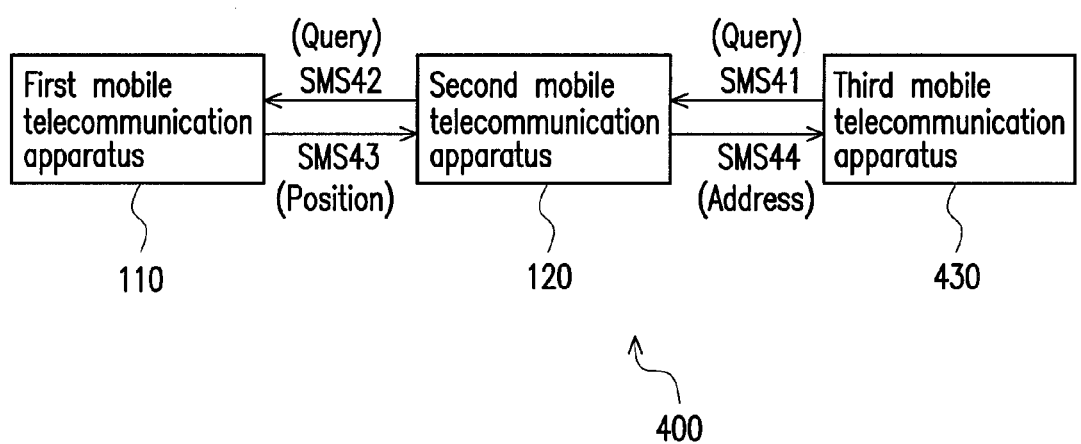
FIG. 4 is a schematic view of an application scenario of a system for tracking a mobile telecommunication apparatus according to another embodiment of the present invention.

FIG. 4 is a schematic view of an application scenario of a system 400 for tracking a mobile telecommunication apparatus according to another embodiment of the present invention.

For the system 400 for tracking a mobile telecommunication apparatus shown in FIG. 4, reference may be made to the relevant description of FIG. 1, FIG. 2 and FIG. 3. Different from the system 100 shown in FIG. 1, the system 400 shown in FIG. 4 further includes a third mobile telecommunication apparatus 430. Any mobile electronic apparatus capable of transmitting and receiving the SMS may be used as the third mobile telecommunication apparatus 430, for example, a mobile phone. An elderly person (or a child) being cared for may carry/use the first mobile telecommunication apparatus 110, a main caregiver of the elderly person (or child) being cared for may carry/use the second mobile telecommunication apparatus 120, and another family member may carry/use the third mobile telecommunication apparatus 430.

The third mobile telecommunication apparatus 430 may transmit a query request SMS41 to the second mobile telecommunication apparatus 120 by the SMS. Those skilled in the art may define the data structure, syntax and content of the query request SMS41 according to design demands. For example, an SMS message carrying the query request SMS41 includes a leading code, a type code, a password and a phone number. For example, according to design demands, those skilled in the art may define the leading code as "*#LR", use a type code "1" to indicate that the query through the SMS message is triggered by the third mobile telecommunication apparatus 430, define the password as "1234", and define different fields separated by ",". Here, it is assumed that the phone number of the third mobile telecommunication apparatus 430 is "0922789654". Therefore, the content of the query request SMS41 in the SMS message transmitted to the second mobile telecommunication apparatus 120 may be "*#LR, 1, 1234, 0922789654".

If the second mobile telecommunication apparatus 120 determines that the leading code and the password of the query request SMS41 are correct, the second mobile telecommunication apparatus 120 transmits a query instruction SMS42 to the first mobile telecommunication apparatus 110 by the SMS in accordance with the query request SMS41. For the query instruction SMS42, reference may be made to the relevant description of the query instruction SMS11 in the foregoing embodiment. In this embodiment, the content of the query instruction SMS42 may be the same as the content of the query request SMS41 from the third mobile telecommunication apparatus 430. That is to say, the query instruction SMS42 also includes a leading code, a password and a phone number of the third mobile telecommunication apparatus 430.

After the SMS management module 220 of the first mobile telecommunication apparatus 110 receives the query instruction SMS42, the SMS management module 220 checks whether the query instruction SMS42 conforms to a communication protocol. If the first mobile telecommunication apparatus 110 determines that the leading code and the password of the instruction SMS42 are correct, the GPS module 210 of the first mobile telecommunication apparatus 110 is powered on or enabled, to generate the latitude and longitude data to the SMS management module 220. Therefore, the SMS management module 220 of the first mobile telecommunication apparatus 110 may transmit the position information SMS43 back to the second mobile telecommunication apparatus 120 in accordance with the query instruction SMS42. For the position information SMS43, reference may be made to the relevant description of the position information SMS12 in the foregoing embodiment. Different from the position information SMS12, the type code in the position information SMS43 is "1", indicating that the query through the SMS message is triggered by the third mobile telecommunication apparatus 430. Also different from the position information SMS12, the phone number recorded by the position information SMS43 is the phone number of the third mobile telecommunication apparatus 430.

After the position information SMS43 is transmitted back to the second mobile telecommunication apparatus 120, the GPS module 210 is powered off or disabled, so as to save the power consumption of the GPS module 210. On the other hand, after the position information SMS43 is transmitted back to the second mobile telecommunication apparatus 120, the SMS management module 220 of the first mobile telecommunication apparatus 110 deletes the SMS message carrying the query instruction SMS42 and the SMS message carrying the position information SMS43, so as to prevent the SMS messages from occupying the memory space.

The second mobile telecommunication apparatus 120 converts the position information SMS43 to an address SMS44 corresponding to a location of the first mobile telecommunication apparatus 110. For the operation of the second mobile telecommunication apparatus 120, reference may be made to the relevant description of the foregoing embodiment, so that the details will not be described herein again. After the conversion is completed, the second mobile telecommunication apparatus 120 transmits the address SMS44 back to the third mobile telecommunication apparatus 430 by the SMS. Therefore, a non-smart phone may obtain the address SMS44 of the first mobile telecommunication apparatus 110 through the second mobile telecommunication apparatus 120 simply by the SMS.

Based on the above, a method for tracking a mobile telecommunication apparatus is described herein. The method includes: a GPS module 210 providing position information of a first mobile telecommunication apparatus 110; a second mobile telecommunication apparatus 120 transmitting a query instruction to the first mobile telecommunication apparatus 110 by the SMS; and the first mobile telecommunication apparatus 110 transmitting the position information back to the second mobile telecommunication apparatus 120 by the SMS in accordance with the query instruction.

In another embodiment, a method for tracking a mobile telecommunication apparatus includes: a third mobile telecommunication apparatus 430 transmitting a query request to a second mobile telecommunication apparatus 120 by the SMS; the second mobile telecommunication apparatus 120 transmitting a query instruction to a first mobile telecommunication apparatus 110 in accordance with the query request; a GPS module 210 providing position information of the first mobile telecommunication apparatus 110; the first mobile telecommunication apparatus 110 transmitting the position information back to the second mobile telecommunication apparatus 120 by the SMS in accordance with the query instruction; the second mobile telecommunication apparatus 120 converting the position information to an address corresponding to a location of the first mobile telecommunication apparatus 110; and the second mobile telecommunication apparatus 120 transmitting the address back to the third mobile telecommunication apparatus 430 by the SMS.

In the above embodiments, the second mobile telecommunication apparatus 120 may transmit the query instruction to the first mobile telecommunication apparatus 110 by the SMS, and the first mobile telecommunication apparatus 110 transmits the position information provided by the GPS module 210 back to the second mobile telecommunication apparatus by the SMS in accordance with the query instruction. Therefore, the second mobile telecommunication apparatus 120 may directly track the location of the first mobile telecommunication apparatus 110 without requiring any additional remote server.

Figure 5:
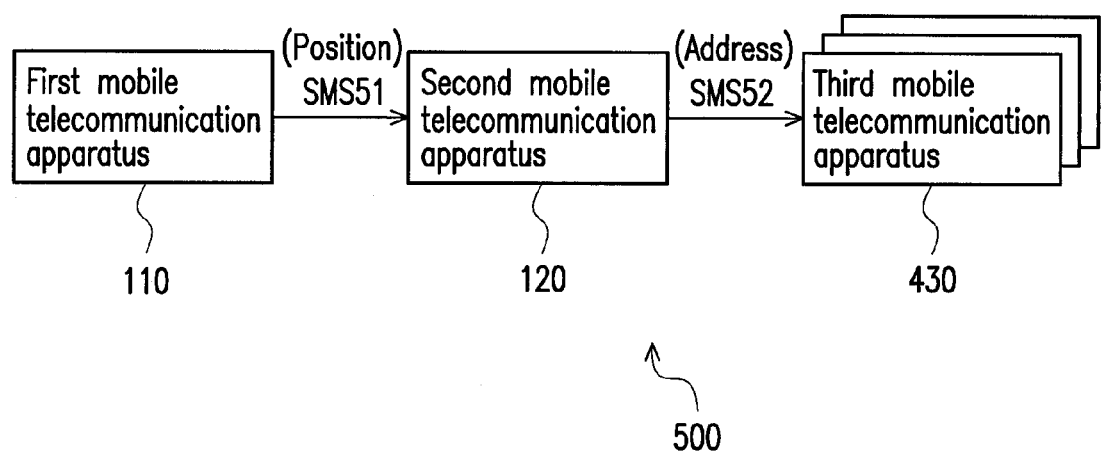
FIG. 5 is a schematic view of an application scenario of a system for tracking a mobile telecommunication apparatus according to still another embodiment of the present invention.

FIG. 5 is a schematic view of an application scenario of a system 500 for tracking a mobile telecommunication apparatus according to still another embodiment of the present invention. For the system 500 for tracking a mobile telecommunication apparatus shown in FIG. 5, reference may be made to the relevant description of FIG. 1, FIG. 2, FIG. 3 and FIG. 4. Different from the system 100 shown in FIG. 1, the second mobile telecommunication apparatus 120 in the system 500 shown in FIG. 5 has a database management module for recording at least one emergency contact phone number, for example, a phone number of the third mobile telecommunication apparatus 430 shown in FIG. 5.

Referring to FIG. 5, the first mobile telecommunication apparatus 110 is a mobile phone for the elderly/children, and therefore, the first mobile telecommunication apparatus 110 has an emergency function. Once the emergency function of the first mobile telecommunication apparatus 110 is triggered, the emergency function sends an emergent SMS message to all mobile telecommunication apparatuses recorded in an emergency contact phone number list preset in the first mobile telecommunication apparatus 110, and then automatically calls all mobile telecommunication apparatuses recorded in the emergency contact phone number list in the first mobile telecommunication apparatus 110 according to a sequence. For example, it is assumed that the second mobile telecommunication apparatus 120 is one of the mobile telecommunication apparatuses recorded in the emergency contact phone number list in the first mobile telecommunication apparatus 110. When the emergency function of the first mobile telecommunication apparatus 110 is triggered, the emergency function sends an emergent SMS message to the second mobile telecommunication apparatus 120, in which the content of the emergent SMS message is, for example, "Emergency, call back asap!". After the emergent SMS message is sent, the first mobile telecommunication apparatus 110 automatically calls the second mobile telecommunication apparatus 120. However, the emergent SMS message does not contain any information about the location of the first mobile telecommunication apparatus 110. For scenarios where the elderly person (or child) being cared for cannot tell the current location, the operation of sending the emergent SMS message and the automatic calling operation of the first mobile telecommunication apparatus 110 cannot achieve an immediate effective tracking effect.

Therefore, in this embodiment, when the emergency function of the first mobile telecommunication apparatus 110 is triggered, the first mobile telecommunication apparatus 110 not only performs the operation of sending the emergent SMS message and the automatic calling operation, but also transmits "emergency position information" SMS51 to the second mobile telecommunication apparatus 120 by the SMS. In this embodiment, after the emergency function of the first mobile telecommunication apparatus 110 is triggered, the GPS module 210 of the first mobile telecommunication apparatus 110 is powered on or enabled, to generate the latitude and longitude data (the position information) to the SMS management module 220. After the SMS management module 220 of the first mobile telecommunication apparatus 110 transmits the emergency position information SMS51 to the second mobile telecommunication apparatus 120, the GPS module 210 is powered off or disabled.

The emergency position information SMS51 includes a leading code, a type code, a phone number, the latitude and longitude data provided by the GPS module, and UTC, an MCC, an MNC and an LAC as well as a cell ID code of the base station provided by the base station to which the first mobile telecommunication apparatus 110 belongs. In this embodiment, as the emergency position information SMS51 is actively sent by the first mobile telecommunication apparatus 110, rather than being sent in accordance with a request of the second mobile telecommunication apparatus 120, the "type code" and the "phone number" in the emergency position information SMS51 are respectively set to "2" and "0000". For example, the content of the emergency position information SMS51 is "*#LR, 2, 21.12345, 121.12345, 123456789012345, 0000, 32226, 446, 92, 2800, 030728", that is, "leading code, type code, latitude, longitude, IMEI, phone number, cell ID, MCC, MNC, LAC, UTC". After the emergency position information SMS51 is transmitted to the second mobile telecommunication apparatus 120, the SMS management module 220 of the first mobile telecommunication apparatus 110 does not delete the SMS message carrying the emergency position information SMS51.

Therefore, even if the elderly person (or child) being cared for cannot tell the current location, the user may immediately and effectively obtain the current location of the first mobile telecommunication apparatus 110 through the emergency position information SMS51 received by the second mobile telecommunication apparatus 120, and then take appropriate rescue measures at once.

Furthermore, the second mobile telecommunication apparatus 120 may record the emergency position information SMS51 in a database management module, and convert the emergency position information SMS51 into a text address SMS52 through the map management module. After the second mobile telecommunication apparatus 120 converts the emergency position information SMS51 to the text address SMS52 corresponding to the location of the first mobile telecommunication apparatus 110, the second mobile telecommunication apparatus 120 automatically transmits the address SMS52 and an emergency text to a telecommunication apparatus corresponding to the at least one emergency contact phone number recorded by the database management module by the SMS. For example, the second mobile telecommunication apparatus 120 transmits the address SMS52 and the emergency text to the third mobile telecommunication apparatus 430 by the SMS.

Therefore, not only the user of the second mobile telecommunication apparatus 120 may immediately obtain the current location (address) of the elderly person (or child) being cared for and the emergent message, other family members/caregivers of the elderly person (or child) being cared for may also know the current location (address) of the elderly person (or child) being cared for and the emergent message with a shortest period.

The second mobile telecommunication apparatus 120 may determine an order of priorities for event processing in "iGuardian Application System" according to design demands. For example, this embodiment will set the order of priorities for event processing of the second mobile telecommunication apparatus 120 to be that an incoming call has a higher priority than (or the same priority as) the emergent SMS message, and the emergent SMS message has a higher priority than the SMS message carrying the emergency position information SMS51. For example, when the emergency function of the first mobile telecommunication apparatus 110 automatically calls the second mobile telecommunication apparatus 120, and the second mobile telecommunication apparatus 120 answers the incoming call from the first mobile telecommunication apparatus 110, if the second mobile telecommunication apparatus 120 receives the emergent SMS message of the first mobile telecommunication apparatus 110, the second mobile telecommunication apparatus 120 may discard the emergent SMS message. When the second mobile telecommunication apparatus 120 answers the automatic incoming call from the emergency function of the first mobile telecommunication apparatus 110, if the second mobile telecommunication apparatus 120 receives the SMS message carrying the emergency position information SMS51, the second mobile telecommunication apparatus 120 maintains the emergency position information SMS51 sent by the first mobile telecommunication apparatus 110. After the second mobile telecommunication apparatus 120 hangs up the incoming call, "iGuardian Application System" of the second mobile telecommunication apparatus 120 processes the emergency position information SMS51, so as to display the location of the first mobile telecommunication apparatus 110 on an electronic map.

When the second mobile telecommunication apparatus 120 is processing the emergent SMS message of the first mobile telecommunication apparatus 110, if the emergency function of the first mobile telecommunication apparatus 110 automatically calls the second mobile telecommunication apparatus 120, the second mobile telecommunication apparatus 120 pauses processing the emergent SMS message and automatically answers the incoming call from the first mobile telecommunication apparatus 110 in a "hands free mode" (or loudspeaker mode). After the second mobile telecommunication apparatus 120 hangs up the incoming call, the second mobile telecommunication apparatus 120 resumes processing the emergent SMS message.

When the second mobile telecommunication apparatus 120 is processing the emergent SMS message of the first mobile telecommunication apparatus 110, if the first mobile telecommunication apparatus 110 transmits another emergent SMS message having the same content to the second mobile telecommunication apparatus 120, the second mobile telecommunication apparatus 120 discards the second emergent SMS message and continues processing the first emergent SMS message. When the second mobile telecommunication apparatus 120 is processing the emergent SMS message of the first mobile telecommunication apparatus 110, if the second mobile telecommunication apparatus 120 receives the SMS message carrying the emergency position information SMS51, the second mobile telecommunication apparatus 120 maintains the emergency position information SMS51 sent by the first mobile telecommunication apparatus 110 and continues processing the emergent SMS message.

After the processing of the emergent SMS message is completed, "iGuardian Application System" of the second mobile telecommunication apparatus 120 processes the emergency position information SMS51, so as to display the location of the first mobile telecommunication apparatus 110 on an electronic map.

When the second mobile telecommunication apparatus 120 is processing the SMS message carrying the emergency position information SMS51 sent by the first mobile telecommunication apparatus 110, if the emergency function of the first mobile telecommunication apparatus 110 automatically calls the second mobile telecommunication apparatus 120, the second mobile telecommunication apparatus 120 pauses processing the SMS message carrying the emergency position information SMS51, and automatically answers the incoming call from the first mobile telecommunication apparatus 110 in a "hands free mode" (or loudspeaker mode). After the second mobile telecommunication apparatus 120 hangs up the incoming call, the second mobile telecommunication apparatus 120 resumes processing the SMS message carrying the emergency position information SMS51.

When the second mobile telecommunication apparatus 120 is processing the SMS message carrying the emergency position information SMS51 sent by the first mobile telecommunication apparatus 110, if the first mobile telecommunication apparatus 110 transmits the emergent SMS message to the second mobile telecommunication apparatus 120, the second mobile telecommunication apparatus 120 pauses processing the SMS message carrying the emergency position information SMS51, and preferentially processes the emergent SMS message (for example, reminds the user of reading the emergent SMS message). After the processing of the emergent SMS message is completed, "iGuardian Application System" of the second mobile telecommunication apparatus 120 resumes processing the SMS message carrying the emergency position information SMS51, so as to display the location of the first mobile telecommunication apparatus 110 on an electronic map.

Based on the above, a method for tracking a mobile telecommunication apparatus is described herein. The method includes: a GPS module providing position information of a first mobile telecommunication apparatus 110; a second mobile telecommunication apparatus 120 recording at least one emergency contact phone number; when an emergency function of the first mobile telecommunication apparatus 110 is triggered, the first mobile telecommunication apparatus 110 transmitting the position information to the second mobile telecommunication apparatus 120 by the SMS; the second mobile telecommunication apparatus 120 converting the emergency position information to an address corresponding to a location of the first mobile telecommunication apparatus 110; and the second mobile telecommunication apparatus 120 transmitting the address and an emergency text to a telecommunication apparatus corresponding to the at least one emergency contact phone number by the SMS.

When the emergency function of the first mobile telecommunication apparatus 110 is triggered, in the above embodiments, the first mobile telecommunication apparatus 110 may actively transmit the position information to the second mobile telecommunication apparatus 120 by the SMS. Therefore, even if the user of the first mobile telecommunication apparatus 110 cannot tell the current location, the user of the second mobile telecommunication apparatus 120 may also immediately and effectively obtain the current location of the first mobile telecommunication apparatus 110 through the received emergency position information SMS51, and then take appropriate rescue measures at once.

In some embodiments, the second mobile telecommunication apparatus 120 may convert the emergency position information SMS51 to the text address SMS52, and automatically transmit the address SMS52 and the emergency text to at least one third mobile telecommunication apparatus 430 by the SMS. Therefore, "iGuardian Application System" enables multiple family members/caregivers to take care of the user of the first mobile telecommunication apparatus 110 together.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for tracking a mobile telecommunication apparatus, comprising: a first mobile telecommunication apparatus, comprising a Global Positioning System (GPS) module to provide position information of the first mobile telecommunication apparatus; and a second mobile telecommunication apparatus, transmitting a query instruction to the first mobile telecommunication apparatus by the Short Message Service (SMS), wherein the second mobile telecommunication apparatus converts the position information to an address corresponding to a location of the first mobile telecommunication apparatus; wherein the first mobile telecommunication apparatus transmits the position information back to the second mobile telecommunication apparatus by the SMS in accordance with the query instruction; a third mobile telecommunication apparatus, transmitting a query request to the second mobile telecommunication apparatus by the SMS; wherein the second mobile telecommunication apparatus transmits the query instruction to the first mobile telecommunication apparatus in accordance with the query request; and the second mobile telecommunication apparatus transmits the address back to the third mobile telecommunication apparatus by the SMS.

2. The system for tracking a mobile telecommunication apparatus according to claim 1, wherein the query instruction comprises a leading code and a password; and if the first mobile telecommunication apparatus determines that the leading code and the password are correct, the first mobile telecommunication apparatus transmits the position information back to the second mobile telecommunication apparatus by the SMS.

3. The system for tracking a mobile telecommunication apparatus according to claim 1, wherein after the first mobile telecommunication apparatus receives the query instruction, the GPS module is powered on to generate the position information; after the first mobile telecommunication apparatus transmits the position information back to the second mobile telecommunication apparatus, the GPS module is powered off; and after the position information is transmitted back to the second mobile telecommunication apparatus, the first mobile telecommunication apparatus deletes an SMS message carrying the query instruction and an SMS message carrying the position information.

4. The system for tracking a mobile telecommunication apparatus according to claim 1, wherein the position information comprises a leading code, a latitude and a longitude.

5. The system for tracking a mobile telecommunication apparatus according to claim 4, wherein the position information further comprises an international mobile equipment identify code, a mobile country code, a mobile network code, a location area code, a cell ID code, and universal time coordinated.

6. The system for tracking a mobile telecommunication apparatus according to claim 1, wherein the second mobile telecommunication apparatus comprises a map management module; and the map management module converts the position information to the address corresponding to the location of the first mobile telecommunication apparatus.

7. The system for tracking a mobile telecommunication apparatus according to claim 1, wherein the second mobile telecommunication apparatus comprises a database management module for recording the position information.

8. The system for tracking a mobile telecommunication apparatus according to claim 1, wherein the query instruction comprises a leading code, a password and a phone number of the third mobile telecommunication apparatus; and if the first mobile telecommunication apparatus determines the leading code and the password are correct, the first mobile telecommunication apparatus transmits the position information back to the second mobile telecommunication apparatus by the SMS.

9. The system for tracking a mobile telecommunication apparatus according to claim 8, wherein the position information comprises a leading code, a latitude, a longitude, an international mobile equipment identify code, a mobile country code, a mobile network code, a location area code, a cell ID code, universal time coordinated, and a phone number of the third mobile telecommunication apparatus.

10. The system for tracking a mobile telecommunication apparatus according to claim 1, wherein the second mobile telecommunication apparatus comprises a database management module for recording at least one emergency contact phone number; when an emergency function of the first mobile telecommunication apparatus is triggered, the first mobile telecommunication apparatus transmits emergency position information to the second mobile telecommunication apparatus by the SMS; the second mobile telecommunication apparatus converts the emergency position information to an address corresponding to a location of the first mobile telecommunication apparatus; and the second mobile telecommunication apparatus transmits the address and an emergency text to a telecommunication apparatus corresponding to the at least one emergency contact phone number recorded by the database management module by the SMS.

11. The system for tracking a mobile telecommunication apparatus according to claim 10, wherein the emergency position information comprises a leading code, a latitude, a longitude, an international mobile equipment identify code, a mobile country code, a mobile network code, a location area code, a cell ID code, and universal time coordinated.

12. The system for tracking a mobile telecommunication apparatus according to claim 10, wherein the second mobile telecommunication apparatus records the emergency position information in the database management module; and the second mobile telecommunication apparatus comprises a map management module for converting the emergency position information to the address.

13. A method for tracking a mobile telecommunication apparatus, comprising: providing position information of a first mobile telecommunication apparatus by a Global Positioning System (GPS) module; transmitting a query instruction from a second mobile telecommunication apparatus to the first mobile telecommunication apparatus by the Short Message Service (SMS); transmitting the position information from the first mobile telecommunication apparatus back to the second mobile telecommunication apparatus by the SMS in accordance with the query instruction and converting the position information to an address corresponding to a location of the first mobile telecommunication apparatus by the second mobile telecommunication apparatus; transmitting a query request from a third mobile telecommunication apparatus to the second mobile telecommunication apparatus by the SMS; transmitting the query instruction from the second mobile telecommunication apparatus to the first mobile telecommunication apparatus in accordance with the query request; and transmitting the address from the second mobile telecommunication apparatus back to the third mobile telecommunication apparatus by the SMS.

14. The method for tracking a mobile telecommunication apparatus according to claim 13, wherein the query instruction comprises a leading code and a password; and the method further comprises:
    checking the leading code and the password by the first mobile telecommunication apparatus; and
    transmitting the position information from the first mobile telecommunication apparatus back to the second mobile telecommunication apparatus by the SMS if the first mobile telecommunication apparatus determines that the leading code and the password are correct.

15. The method for tracking a mobile telecommunication apparatus according to claim 13, further comprising:
powering on the GPS module to generate the position information after the first mobile telecommunication apparatus receives the query instruction;
powering off the GPS module after the first mobile telecommunication apparatus transmits the position information back to the second mobile telecommunication apparatus; and
deleting an SMS message carrying the query instruction and an SMS message carrying the position information by the first mobile telecommunication apparatus after the position information is transmitted back to the second mobile telecommunication apparatus.

16. The method for tracking a mobile telecommunication apparatus according to claim 13, wherein the position information comprises a leading code, a latitude and a longitude.

17. The method for tracking a mobile telecommunication apparatus according to claim 16, wherein the position information further comprises an international mobile equipment identify code, a mobile country code, a mobile network code, a location area code, a cell ID code, and universal time coordinated.

18. The method for tracking a mobile telecommunication apparatus according to claim 13, further comprising:
converting the position information to the address corresponding to the location of the first mobile telecommunication apparatus by the second mobile telecommunication apparatus.

19. The method for tracking a mobile telecommunication apparatus according to claim 13, further comprising:
recording the position information by the second mobile telecommunication apparatus.

20. The method for tracking a mobile telecommunication apparatus according to claim 13, further comprising: recording at least one emergency contact phone number by the second mobile telecommunication apparatus;
transmitting emergency position information from the first mobile telecommunication apparatus to the second mobile telecommunication apparatus by the SMS when an emergency function of the first mobile telecommunication apparatus is triggered;
converting the emergency position information to an address corresponding to a location of the first mobile telecommunication apparatus by the second mobile telecommunication apparatus; and transmitting the address and an emergency text from the second mobile telecommunication apparatus to a telecommunication apparatus corresponding to the at least one emergency contact phone number by the SMS.

21. The method for tracking a mobile telecommunication apparatus according to claim 20, wherein the emergency position information comprises a leading code, a latitude, a longitude, an international mobile equipment identify code, a mobile country code, a mobile network code, a location area code, a cell ID code, and universal time coordinated.

22. The method for tracking a mobile telecommunication apparatus according to claim 20, further comprising:
recording the emergency position information by the second mobile telecommunication apparatus.

23. A system for tracking a mobile telecommunication apparatus, comprising:
a first mobile telecommunication apparatus, comprising a Global Positioning System (GPS) module to provide an emergency position information of the first mobile telecommunication apparatus; and
a second mobile telecommunication apparatus, comprising a database management module for recording at least one emergency contact phone number;
wherein when an emergency function of the first mobile telecommunication apparatus is triggered, the first mobile telecommunication apparatus transmits the emergency position information to the second mobile telecommunication apparatus by the Short Message Service (SMS); the second mobile telecommunication apparatus converts the emergency position information to an address corresponding to a location of the first mobile telecommunication apparatus; and the second mobile telecommunication apparatus transmits the address and an emergency text to a telecommunication apparatus corresponding to the at least one emergency contact phone number recorded by the database management module by the SMS.

24. The system for tracking a mobile telecommunication apparatus according to claim 23, wherein the emergency position information comprises a leading code, a latitude, a longitude, an international mobile equipment identify code, a mobile country code, a mobile network code, a location area code, a cell ID code, and universal time coordinated.

25. The system for tracking a mobile telecommunication apparatus according to claim 23, wherein the second mobile telecommunication apparatus records the emergency position information in the database management module; and the second mobile telecommunication apparatus comprises a map management module for converting the emergency position information to the address.

26. A method for tracking a mobile telecommunication apparatus, comprising:
providing an emergency position information of a first mobile telecommunication apparatus by a Global Positioning System (GPS) module;
recording at least one emergency contact phone number by a second mobile telecommunication apparatus;
transmitting the emergency position information from the first mobile telecommunication apparatus to the second mobile telecommunication apparatus by the Short Message Service (SMS) when an emergency function of the first mobile telecommunication apparatus is triggered;
converting the emergency position information to an address corresponding to a location of the first mobile telecommunication apparatus by the second mobile telecommunication apparatus; and
transmitting the address and an emergency text from the second mobile telecommunication apparatus to a telecommunication apparatus corresponding to the at least one emergency contact phone number by the SMS.

27. The method for tracking a mobile telecommunication apparatus according to claim 26, wherein the emergency position information comprises a leading code, a latitude, a longitude, an international mobile equipment identify code, a mobile country code, a mobile network code, a location area code, a cell ID code, and universal time coordinated.

* * * * *